(12) United States Patent
Taniguchi et al.

(10) Patent No.: US 11,060,198 B2
(45) Date of Patent: Jul. 13, 2021

(54) WATER ELECTROLYSIS SYSTEM AND METHOD OF OPERATING WATER ELECTROLYSIS SYSTEM

(71) Applicant: KAWASAKI JUKOGYO KABUSHIKI KAISHA, Kobe (JP)

(72) Inventors: Tatsuya Taniguchi, Akashi (JP); Ayaka Oishi, Akashi (JP); Ikuo Nagashima, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 327 days.

(21) Appl. No.: 16/345,290

(22) PCT Filed: Feb. 15, 2018

(86) PCT No.: PCT/JP2018/005326
§ 371 (c)(1),
(2) Date: Apr. 26, 2019

(87) PCT Pub. No.: WO2018/155308
PCT Pub. Date: Aug. 30, 2018

(65) Prior Publication Data
US 2019/0271091 A1    Sep. 5, 2019

(30) Foreign Application Priority Data

Feb. 23, 2017   (JP) .............................. JP2017-032160

(51) Int. Cl.
*C25B 15/08*    (2006.01)
*C25B 15/02*    (2021.01)
*C25B 9/00*     (2021.01)
*C25B 1/04*     (2021.01)
(Continued)

(52) U.S. Cl.
CPC ................ *C25B 15/08* (2013.01); *C25B 1/04* (2013.01); *C25B 9/00* (2013.01); *C25B 9/19* (2021.01); *C25B 9/73* (2021.01); *C25B 15/02* (2013.01); *Y02E 60/36* (2013.01)

(58) Field of Classification Search
CPC .. C25B 1/02; C25B 1/04; C25B 15/02; C25B 15/08
See application file for complete search history.

(56) References Cited

U.S. PATENT DOCUMENTS 9,186,624 B2 * 11/2015 Blanchet ............. B01D 53/326
10,590,552 B2 * 3/2020 Harano ................... C25B 15/02

FOREIGN PATENT DOCUMENTS

JP        2006-131957 A     5/2006

* cited by examiner

*Primary Examiner* — Nicholas A Smith
(74) *Attorney, Agent, or Firm* — Oliff PLC

(57) ABSTRACT

A water electrolysis system includes: a water electrolysis tank; a cathode side gas passage through which a cathode side gas flows; a monitoring device configured to monitor at least one of a hydrogen concentration of the cathode side gas in the cathode side gas passage, an oxygen concentration of the cathode side gas in the cathode side gas passage, and an amount of electric power supplied to the water electrolysis tank; a hydrogen supply passage through which a hydrogen gas is supplied to the cathode side gas in the cathode side gas passage to increase the hydrogen concentration of the cathode side gas; and a flow regulating valve configured to regulate a flow rate of the hydrogen gas supplied through the hydrogen supply passage to the cathode side gas.

6 Claims, 2 Drawing Sheets

(51) Int. Cl.
*C25B 9/19* (2021.01)
*C25B 9/73* (2021.01)

WATER ELECTROLYSIS SYSTEM AND METHOD OF OPERATING WATER ELECTROLYSIS SYSTEM

TECHNICAL FIELD

The present invention relates to a water electrolysis system and a method of operating the water electrolysis system.

BACKGROUND ART

For example, known is a water electrolysis system which stores renewable energy, such as wind power, by producing hydrogen from the renewable energy and by which the renewable energy is stably usable. The water electrolysis system includes a water electrolysis tank. The water electrolysis tank includes: an anode chamber configured to electrolyze water to generate an oxygen gas; a cathode chamber configured to electrolyze water to generate a hydrogen gas; and a diaphragm arranged between the anode chamber and the cathode chamber.

PTL 1 discloses a hydrogen/oxygen gas generator capable of preventing a case where one of the hydrogen gas and the oxygen gas flows through the diaphragm to be mixed with the other of the hydrogen gas and the oxygen gas.

CITATION LIST

Patent Literature

PTL 1: Japanese Laid-Open Patent Application Publication No. 2006-131957

SUMMARY OF INVENTION

Technical Problem

PTL 1 does not consider how to deal with a case where the hydrogen gas and the oxygen gas are mixed with each other in the hydrogen/oxygen gas generator.

An object of the present invention is to, even when an oxygen gas generated at an anode side in a water electrolysis system configured to produce hydrogen flows through a diaphragm to be mixed with a hydrogen gas generated at a cathode side, and this increases an oxygen concentration of the mixture gas, safely reduce the oxygen concentration of the mixture gas. Another object of the present invention is to improve production efficiency of the hydrogen by preventing a case of discarding the hydrogen gas that does not satisfy purity due to the mixing with the oxygen.

Solution to Problem

To solve the above problems, a water electrolysis system according to one aspect of the present invention includes: a water electrolysis tank including an anode chamber including an anode therein and configured to electrolyze water by electric power to generate an oxygen gas, the electric power being supplied from an outside, a cathode chamber including a cathode therein and configured to electrolyze the water by the electric power to generate a hydrogen gas, and a diaphragm arranged between the anode chamber and the cathode chamber; a cathode side gas passage through which a cathode side gas discharged from the cathode chamber and containing the hydrogen gas flows; a monitoring device configured to monitor at least one of a hydrogen concentration of the cathode side gas in the cathode side gas passage, an oxygen concentration of the cathode side gas in the cathode side gas passage, and an amount of electric power supplied to the water electrolysis tank; a hydrogen supply passage through which the hydrogen gas is supplied to the cathode side gas in the cathode side gas passage to increase the hydrogen concentration of the cathode side gas; and a flow regulating valve configured to regulate a flow rate of the hydrogen gas supplied through the hydrogen supply passage to the cathode side gas.

According to the above configuration, for example, when it is confirmed based on a monitoring result of the monitoring device that the hydrogen concentration of the cathode side gas flowing through the cathode side gas passage is the reference hydrogen concentration or less, the oxygen concentration of the cathode side gas flowing through the cathode side gas passage is the reference oxygen concentration or more, or the amount of electric power supplied to the water electrolysis tank is the reference electric power amount or less, the hydrogen gas can be supplied to the cathode side gas by opening the flow regulating valve. Further, for example, when it is confirmed based on the monitoring result of the monitoring device that the hydrogen concentration is higher than the reference hydrogen concentration, the oxygen concentration is lower than the reference oxygen concentration, or the amount of electric power supplied is larger than the reference electric power amount, the supply of the hydrogen gas to the cathode side gas can be stopped by closing the flow regulating valve.

Therefore, in the water electrolysis system, even when the oxygen gas generated at the anode side flows through the diaphragm to be mixed with the cathode side gas generated at the cathode side and containing the hydrogen gas, and this increases the oxygen concentration of the cathode side gas, the oxygen concentration of the cathode side gas can be safely reduced.

Since the oxygen concentration of the cathode side gas can be reduced by adding the hydrogen gas to the cathode side gas, the cathode side gas is prevented from being discarded. Further, the gas having the same components as the hydrogen produced in the water electrolysis system is added to the cathode side gas. Therefore, the production of the hydrogen in the water electrolysis system can be prevented from being stopped when the hydrogen gas is added to the cathode side gas, and therefore, an operating time of the water electrolysis system can be increased. Thus, the production efficiency of the hydrogen in the water electrolysis system can be improved.

The water electrolysis system may further include a controller configured to control the flow regulating valve based on a monitoring result of the monitoring device, wherein: the controller may control the flow regulating valve to stop supplying the hydrogen gas to the cathode side gas when the hydrogen concentration is higher than a reference hydrogen concentration, the oxygen concentration is lower than a reference oxygen concentration, or the amount of electric power supplied is larger than a reference electric power amount; and the controller may control the flow regulating valve to supply the hydrogen gas to the cathode side gas when the hydrogen concentration is the reference hydrogen concentration or less, the oxygen concentration is the reference oxygen concentration or more, or the amount of electric power supplied is the reference electric power amount or less.

According to the above configuration, the flow regulating valve can be automatically controlled by the controller. Therefore, while reducing the burden of the manual operation of the operator, the production efficiency of the hydrogen can be prevented from deteriorating, and the oxygen concentration of the cathode side gas can be reduced.

The water electrolysis system may further include a compressor configured to compress the cathode side gas, wherein the hydrogen supply passage may be connected to a portion of the cathode side gas passage, the portion being located upstream of the compressor in a flow direction of the cathode side gas. With this, before the compressor performs compression heating of the cathode side gas, the hydrogen concentration of the cathode side gas can be increased, and therefore, the safety of the system can be further improved.

The water electrolysis system may further include a purifier configured to remove the oxygen gas from the cathode side gas to generate the hydrogen gas from the cathode side gas, wherein the hydrogen gas generated by the purifier may be supplied through the hydrogen supply passage to the cathode side gas. The water electrolysis system may further include a storage tank configured to store the hydrogen gas generated by the purifier, wherein the hydrogen gas stored in the storage tank may be supplied through the hydrogen supply passage to the cathode side gas. With this, the oxygen gas in the cathode side gas can be effectively removed without providing an additional hydrogen supply source.

A method of operating a water electrolysis system according to another aspect of the present invention is a method of operating a water electrolysis system, the water electrolysis system including: a water electrolysis tank including an anode chamber including an anode therein and configured to electrolyze water by electric power to generate an oxygen gas, the electric power being supplied from an outside, a cathode chamber including a cathode therein and configured to electrolyze the water by the electric power to generate a hydrogen gas, and a diaphragm arranged between the anode chamber and the cathode chamber; a cathode side gas passage through which a cathode side gas discharged from the cathode chamber and containing the hydrogen gas flows; a monitoring device configured to monitor at least one of a hydrogen concentration of the cathode side gas in the cathode side gas passage, an oxygen concentration of the cathode side gas in the cathode side gas passage, and an amount of electric power supplied to the water electrolysis tank; a hydrogen supply passage through which the hydrogen gas is supplied to the cathode side gas in the cathode side gas passage to increase the hydrogen concentration of the cathode side gas; and a flow regulating valve configured to regulate a flow rate of the hydrogen gas supplied through the hydrogen supply passage to the cathode side gas, the method including controlling the flow regulating valve to (i) stop supplying the hydrogen gas to the cathode side gas when the hydrogen concentration is higher than a reference hydrogen concentration, the oxygen concentration is lower than a reference oxygen concentration, or the amount of electric power supplied to the water electrolysis tank is larger than a reference electric power amount and (ii) supply the hydrogen gas to the cathode side gas when the hydrogen concentration is the reference hydrogen concentration or less, the oxygen concentration is the reference oxygen concentration or more, or the amount of electric power supplied is the reference electric power amount or less.

Advantageous Effects of Invention

According to the present invention, in the water electrolysis system configured to produce hydrogen, even when the oxygen gas generated at the anode side flows through the diaphragm to be mixed with the hydrogen gas generated at the cathode side, and this increases the oxygen concentration of the mixture gas, the oxygen concentration of the mixture gas can be safely reduced. Further, discarding the hydrogen gas that does not satisfy purity due to the mixing with the oxygen is prevented, and therefore, the production efficiency of the hydrogen can be improved.

DESCRIPTION OF EMBODIMENTS

Hereinafter, an embodiment will be explained with reference to the drawings.

Figure 1:
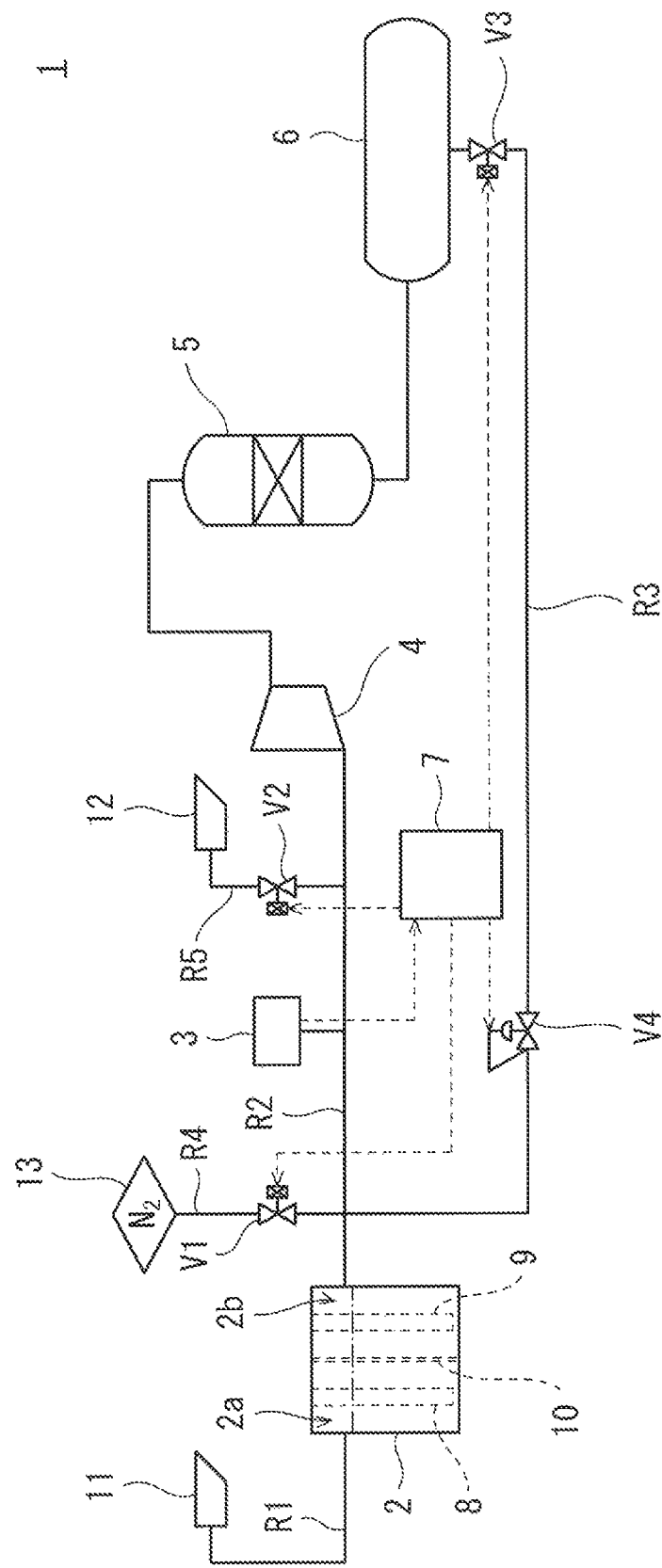
FIG. 1 is a schematic configuration diagram of a water electrolysis system according to an embodiment.

FIG. 1 is a schematic configuration diagram of a water electrolysis system 1 according to the embodiment. The water electrolysis system 1 includes a water electrolysis tank 2, a gas purity analyzer 3, a compressor 4, a purifier 5, a storage tank 6, a controller 7, an anode side gas passage R1, a cathode side gas passage R2, a hydrogen supply passage R3, a nitrogen supply passage R4, a cathode side gas discharge passage R5, flow regulating valves V1 to V4, and discharge ports 11 and 12.

The water electrolysis tank 2 is supplied with electric power (DC power) from an outside. The electric power is, for example, electric power generated from renewable energy, such as wind power, but is not limited to this. The water electrolysis tank 2 includes an anode 8, a cathode 9, and a diaphragm 10. The water electrolysis tank 2 further includes an anode chamber 2a and a cathode chamber 2b. The anode 8 is arranged in the anode chamber 2a, and the anode chamber 2a electrolyzes water to generate an oxygen gas by the electric power supplied from the outside. An anode side gas containing the oxygen gas is discharged from the anode chamber 2a. The cathode 9 is arranged in the cathode chamber 2b, and the cathode chamber 2b electrolyzes water to generate a hydrogen gas by the electric power. A cathode side gas containing the hydrogen gas is discharged from the cathode chamber 2b. The diaphragm 10 is arranged between the anode chamber 2a and the cathode chamber 2b.

The water electrolysis tank 2 of the present embodiment is, for example, an alkaline water electrolysis type, and an electrolytic solution containing potassium hydroxide (KOH) is stored in the anode chamber 2a and the cathode chamber 2b. While the water electrolysis system 1 is operating, electrolytes in the electrolytic solution move in the anode chamber 2a and the cathode chamber 2b through the diaphragm 10, and water is electrolyzed.

The water electrolysis tank 2 is not limited to the alkaline water electrolysis type and may be the other type, such as a solid polymer type. Since FIG. 1 schematically shows the water electrolysis tank 2, one anode chamber 2a and one cathode chamber 2b are shown. However, the number of anode chambers 2a and the number of cathode chambers 2b are not limited. For example, in the water electrolysis tank 2, a plurality of anode chambers 2a and a plurality of cathode chambers 2b may be alternately arranged through a plurality of diaphragms 10.

The anode side gas discharged from the anode chamber 2a and containing the oxygen gas flows through the anode side gas passage R1. An upstream end portion of the anode side gas passage R1 is connected to the anode chamber 2a. The discharge port 11 is provided at a downstream end portion of the anode side gas passage R1. The anode side gas is separated from the electrolytic solution, flows through the anode side gas passage R1, and is then discharged through the discharge port 11 to an outside of the water electrolysis system 1.

The cathode side gas discharged from the cathode chamber 2b and containing the hydrogen gas flows through the cathode side gas passage R2. An upstream end portion of the cathode side gas passage R2 is connected to the cathode chamber 2b. A downstream end portion of the cathode side gas passage R2 is connected to the storage tank 6. The cathode side gas is separated from the electrolytic solution and flows through the cathode side gas passage R2.

The gas purity analyzer 3 analyzes hydrogen purity of the cathode side gas flowing through a portion of the cathode side gas passage R2 which portion is located upstream of the compressor 4 in a flow direction of the cathode side gas (hereinafter simply referred to as "upstream of the compressor 4"). Specifically, the gas purity analyzer 3 measures at least one of a hydrogen concentration and oxygen concentration (herein, the hydrogen concentration as one example) of the cathode side gas separated from the electrolytic solution and flowing through the portion of the cathode side gas passage R2 which portion is located upstream of the compressor 4. A measurement result of the gas purity analyzer 3 is transmitted to the controller 7.

The compressor 4 compresses the cathode side gas. In the present embodiment, the compressor 4 performs compression heating of the cathode side gas. The purifier 5 is arranged at a portion of the cathode side gas passage R2 which portion is located downstream of the compressor 4 in the flow direction of the cathode side gas (hereinafter simply referred to as "downstream of the compressor 4"). The purifier 5 removes the oxygen gas from the cathode side gas to generate the hydrogen gas from the cathode side gas.

The storage tank 6 is arranged at a portion of the cathode side gas passage R2 which portion is located downstream of the purifier 5. The storage tank 6 stores the hydrogen gas generated by the purifier 5. The storage tank 6 may store liquid hydrogen. In this case, a liquefier needs to be provided at a portion of the cathode side gas passage R2 which portion is located between the purifier 5 and the storage tank 6.

The nitrogen supply passage R4 is provided so as to be able to supply a nitrogen gas to the cathode side gas flowing through the cathode side gas passage R2. An upstream end portion of the nitrogen supply passage R4 is connected to a nitrogen source 13. A downstream end portion of the nitrogen supply passage R4 is connected to a portion of the cathode side gas passage R2 which portion is located upstream of the gas purity analyzer 3.

The flow regulating valve V1 is provided at a portion of the nitrogen supply passage R4. The flow regulating valve V1 regulates the flow rate of the nitrogen gas supplied through the nitrogen supply passage R4 to the cathode side gas. When the flow regulating valve V1 opens, the nitrogen gas is supplied to the cathode side gas flowing through the cathode side gas passage R2, and this reduces the hydrogen concentration and oxygen concentration of the cathode side gas. With this, the cathode side gas can be inactivated, and maintenance work of the water electrolysis system 1 and the like can be safely performed.

The cathode side gas discharge passage R5 is provided so as to be able to discharge the cathode side gas from the cathode side gas passage R2 to the outside of the water electrolysis system 1. An upstream end portion of the cathode side gas discharge passage R5 is connected to a portion of the cathode side gas passage R2 which portion is located downstream of the gas purity analyzer 3 and upstream of the compressor 4. The discharge port 12 is provided at a downstream end portion of the cathode side gas discharge passage R5.

The flow regulating valve V2 is provided at a portion of the cathode side gas discharge passage R5. The flow regulating valve V2 regulates the flow rate of the cathode side gas flowing through the cathode side gas discharge passage R5. When the flow regulating valve V2 opens, the cathode side gas flows through the cathode side gas discharge passage R5 to be discharged through the discharge port 12 to the outside of the water electrolysis system 1.

The hydrogen supply passage R3 is provided so as to be able to supply the hydrogen gas to the cathode side gas such that the hydrogen concentration of the cathode side gas flowing through the cathode side gas passage R2 increases. The hydrogen gas flowing through the hydrogen supply passage R3 is, for example, the hydrogen gas stored in the storage tank 6. The hydrogen supply passage R3 is connected to a portion of the cathode side gas passage R2 which portion is located upstream of the compressor 4. In the present embodiment, an upstream end portion of the hydrogen supply passage R3 is connected to the storage tank 6. A downstream end portion of the hydrogen supply passage R3 is connected to a portion of the cathode side gas passage R2 which portion is located upstream of the gas purity analyzer 3.

The flow regulating valves V3 and V4 are provided at portions of the hydrogen supply passage R3. Each of the flow regulating valves V3 and V4 regulates the flow rate of the hydrogen gas supplied through the hydrogen supply passage R3 to the cathode side gas. The flow regulating valve V3 is provided at a portion of the hydrogen supply passage R3. The flow regulating valve V4 is provided at a portion of the hydrogen supply passage R3 which portion is located downstream of the flow regulating valve V3 in the flow direction of the hydrogen gas. When the flow regulating valves V3 and V4 open, the hydrogen gas is supplied to the cathode side gas flowing through the cathode side gas passage R2, and this reduces the oxygen concentration of the cathode side gas.

For example, the flow regulating valves V1 to V3 are electromagnetic flow regulating valves, and the flow regulating valve V4 is a pressure-reducing flow regulating valve. However, the types of the flow regulating valves V1 to V4 are not limited. Further, the number of flow regulating valves provided at the hydrogen supply passage R3 is not limited, and for example, only one of the flow regulating valves V3 and V4 may be provided at the hydrogen supply passage R3. Further, for example, the hydrogen gas flowing through the hydrogen supply passage R3 may be the hydrogen produced by the water electrolysis system 1 or the hydrogen gas supplied from a hydrogen cylinder.

The water electrolysis system 1 includes a monitoring device. The monitoring device monitors at least one of: the hydrogen concentration of the cathode side gas in the cathode side gas passage R2 (hereinafter may be simply referred to as a "hydrogen concentration"); the oxygen concentration of the cathode side gas in the cathode side gas passage R2 (hereinafter may be simply referred to as an "oxygen concentration"); and the amount of electric power supplied to the water electrolysis tank 2 (hereinafter may be simply referred to as an "electric power supply amount"). In the present embodiment, the monitoring device monitors the hydrogen concentration and the electric power supply amount. For example, the monitoring device monitors the hydrogen concentration of the cathode side gas in a portion of the cathode side gas passage R2 which portion is located upstream of the compressor 4. Further, the monitoring device monitors the hydrogen concentration based on a measurement result of the gas purity analyzer 3. Furthermore, the monitoring device monitors the electric power supply amount based on a measured value of an electric power meter provided at the water electrolysis system 1.

The gas purity analyzer 3 and the flow regulating valves V1 to V4 are connected to the controller 7. The controller 7 controls the flow regulating valves V1 and V2 at predetermined timings. Further, the controller 7 controls the flow regulating valves V3 and V4 based on a monitoring result of the monitoring device. In the present embodiment, as one example, the controller 7 also serves as the monitoring device. However, the monitoring device may be provided separately from the controller 7.

The controller 7 is, for example, a computer including a CPU, a RAM, and a ROM. The ROM stores a predetermined control program. The CPU monitors the hydrogen concentration and the electric power supply amount and controls the flow regulating valves V3 and V4 by the control program.

In some cases, in the water electrolysis system, the oxygen gas generated at the anode side flows through the diaphragm to be mixed with the cathode side gas generated at the cathode side and containing the hydrogen gas, and as a result, the cathode side gas becomes the mixture gas. The oxygen gas in the cathode side gas is removed by the purifier. The oxygen concentration of the cathode side gas increases as the electric power supply amount decreases. When the electric power supply amount becomes smaller than a certain amount, the oxygen concentration of the cathode side gas significantly increases in some cases. In conventional cases, when the oxygen concentration of the cathode side gas exceeds a specified value, for example, the oxygen concentration of the cathode side gas is reduced by adding the nitrogen gas to the cathode side gas. With this, the safety of the cathode side gas is improved.

However, since it is difficult to separate the hydrogen gas and the nitrogen gas after the hydrogen gas and the nitrogen gas are mixed with each other, the cathode side gas to which the nitrogen gas is added is discharged to an outside of the water electrolysis system. By this discharging, a part of the produced hydrogen is discarded. Further, even when the nitrogen gas is added to the cathode side gas, and then, the electric power supply amount recovers, restarting the production of the hydrogen in the water electrolysis system is difficult until the nitrogen gas remaining in the cathode side gas passage is adequately removed.

Further, according to electric power generation by utilizing renewable energy, the amount of electric power generated easily changes depending on conditions, such as weather. Therefore, when operating the water electrolysis system by utilizing the renewable energy, the electric power supply amount tends to become a specified value or less, and accordingly, the oxygen concentration of the cathode side gas tends to exceed a specified value. With this, the amount of hydrogen discarded after the nitrogen gas is added may increase.

On the other hand, as described below, the water electrolysis system 1 controls the flow regulating valves V3 and V4 to stop supplying the hydrogen gas to the cathode side gas when (i) the hydrogen concentration is higher than a predetermined reference hydrogen concentration, (ii) the oxygen concentration is lower than a predetermined reference oxygen concentration, or (iii) the amount of electric power supplied to the water electrolysis tank 2 is larger than a predetermined reference electric power amount, and controls the flow regulating valves V3 and V4 to supply the hydrogen gas to the cathode side gas when (i) the hydrogen concentration is the reference hydrogen concentration or less, (ii) the oxygen concentration is the reference oxygen concentration or more, or (iii) the amount of electric power supplied to the water electrolysis tank 2 is the reference electric power amount or less. The oxygen gas contained in the cathode side gas is removed by the purifier 5. With this, according to the water electrolysis system 1, the amount of hydrogen discarded after the nitrogen gas is added can be reduced, and the hydrogen can be produced with high production efficiency.

Figure 2:
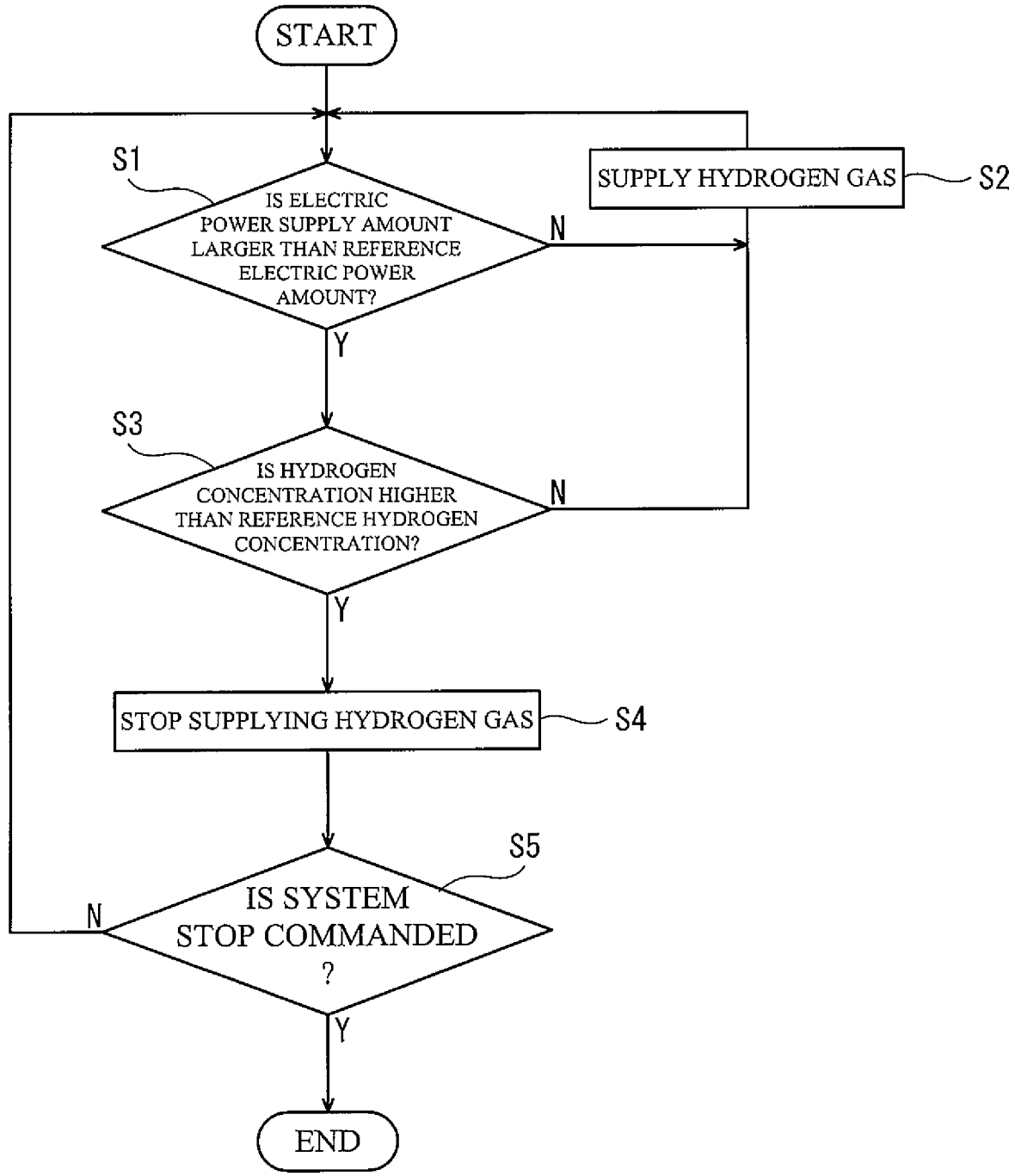
FIG. 2 is a diagram showing a control flow of the water electrolysis system of FIG. 1.

Hereinafter, a control flow of the water electrolysis system 1 will be explained. FIG. 2 is a diagram showing the control flow of the water electrolysis system of FIG. 1. In the water electrolysis system 1 in operation, the controller 7 determines whether or not the amount of electric power supplied to the water electrolysis tank 2 is larger than the reference electric power amount (S1). When the controller 7 determines in S1 that the amount of electric power supplied to the water electrolysis tank 2 is larger than the reference electric power amount, the controller 7 then determines whether or not the hydrogen concentration is higher than the reference hydrogen concentration (S3). The reference electric power amount and the reference hydrogen concentration are set in advance by an operator and can be suitably set.

When the controller 7 determines in S1 that the amount of electric power supplied to the water electrolysis tank 2 is not larger than the reference electric power amount (i.e., the amount of electric power supplied to the water electrolysis tank 2 is the reference electric power amount or less) or when the controller 7 determines in S3 that the hydrogen concentration is not higher than the reference hydrogen concentration (i.e., the hydrogen concentration is the reference hydrogen concentration or less), the controller 7 opens the flow regulating valves V3 and V4 for a certain period of time to supply a certain amount of hydrogen gas to the cathode side gas flowing through a portion of the cathode side gas passage R2 which portion is located upstream of the compressor 4 (herein, upstream of the gas purity analyzer 3) (S2). With this, the oxygen concentration of the cathode side gas is reduced.

The controller 7 repeatedly performs S1 to S3 until the controller 7 determines in S1 that the amount of electric power supplied to the water electrolysis tank 2 is larger than the reference electric power amount and determines in S3 that the hydrogen concentration is higher than the reference hydrogen concentration. When the controller 7 determines in S3 that the hydrogen concentration is higher than the reference hydrogen concentration, the controller 7 then closes the flow regulating valves V3 and V4 to stop supplying the hydrogen gas to the cathode side gas (S4).

The controller 7 then determines whether or not a stop of the water electrolysis system 1 is commanded (S5). The controller 7 repeatedly performs S1 to S5 until the controller 7 determines in S5 that the stop of the water electrolysis system 1 is commanded. When the controller 7 determines in S5 that the stop of the water electrolysis system 1 is commanded, the controller 7 terminates the control flow. It should be noted that the order of S1 and S3 in the control flow may be reversed, or only one of S1 and S3 may be performed.

As explained above, in the water electrolysis system 1, for example, when it is confirmed based on the monitoring result of the monitoring device that the hydrogen concentration of the cathode side gas flowing through the cathode side gas passage R2 is the reference hydrogen concentration or less or that the amount of electric power supplied to the water electrolysis tank 2 is the reference electric power amount or less, the hydrogen gas can be supplied to the cathode side gas by opening the flow regulating valves V3 and V4. Further, for example, when it is confirmed based on the monitoring result of the monitoring device that the hydrogen concentration is higher than the reference hydrogen concentration or that the electric power supply amount is larger than the reference electric power amount, the supply of the hydrogen gas to the cathode side gas can be stopped by closing the flow regulating valves V3 and V4.

Therefore, in the water electrolysis system 1, even when the oxygen gas generated at the anode 8 flows through the diaphragm 10 to be mixed with the cathode side gas generated at the cathode 9 and containing the hydrogen gas, and this increases the oxygen concentration of the cathode side gas, the oxygen concentration of the cathode side gas can be safely reduced.

Since the oxygen concentration of the cathode side gas can be reduced by adding the hydrogen gas to the cathode side gas, the cathode side gas is prevented from being discarded. Further, the gas having the same components as the hydrogen produced in the water electrolysis system 1 is added to the cathode side gas. Therefore, the production of the hydrogen in the water electrolysis system 1 can be prevented from being stopped when the hydrogen gas is added to the cathode side gas, and therefore, an operating time of the water electrolysis system 1 can be increased. Thus, the production efficiency of the hydrogen in the water electrolysis system 1 can be improved.

Further, according to the water electrolysis system 1, the flow regulating valves V3 and V4 can be automatically controlled by the controller 7. Therefore, while reducing the burden of the manual operation of the operator, the production efficiency of the hydrogen can be prevented from deteriorating, and the oxygen concentration of the cathode side gas can be reduced.

Further, the hydrogen supply passage R3 is connected to a portion of the cathode side gas passage R2 which portion is located upstream of the compressor 4. Therefore, before the compressor 4 performs the compression heating of the cathode side gas, the hydrogen concentration of the cathode side gas can be increased, and therefore, the safety of the water electrolysis system 1 can be further improved.

The hydrogen gas generated by the purifier 5 is supplied through the hydrogen supply passage R3 to the cathode side gas. Specifically, the hydrogen gas stored in the storage tank 6 is supplied through the hydrogen supply passage R3 to the cathode side gas. With this, the oxygen gas in the cathode side gas can be effectively removed without providing an additional hydrogen supply source. Further, an adequate amount of hydrogen gas can be supplied to the cathode side gas by utilizing the hydrogen gas stored in the storage tank 6.

The controller 7 may determine in S3 whether or not the oxygen concentration is lower than the predetermined reference oxygen concentration. In this case, when the controller 7 determines in S1 that the amount of electric power supplied to the water electrolysis tank 2 is not larger than the reference electric power amount or determines in S3 that the oxygen concentration is not lower than the reference oxygen concentration (i.e., the oxygen concentration is the reference oxygen concentration or more), the controller 7 executes S2. Further, when the controller 7 determines in S1 that the amount of electric power supplied to the water electrolysis tank 2 is larger than the reference electric power amount and determines in S3 that the oxygen concentration is lower than the reference oxygen concentration, the controller 7 executes S4.

The present invention is not limited to the above embodiment, and modifications, additions, and eliminations with respect to the configurations and methods of the present invention may be made within the scope of the present invention.

REFERENCE SIGNS LIST

R2 cathode side gas passage
R3 hydrogen supply passage
V3, V4 flow regulating valve
1 water electrolysis system
2 water electrolysis tank
2a anode chamber
2b cathode chamber
4 compressor
5 purifier
6 storage tank
7 controller
8 anode
9 cathode
10 diaphragm

The invention claimed is:

1. A water electrolysis system comprising:
a water electrolysis tank including
an anode chamber including an anode therein and configured to electrolyze water by electric power to generate an oxygen gas, the electric power being supplied from an outside,
a cathode chamber including a cathode therein and configured to electrolyze the water by the electric power to generate a hydrogen gas, and
a diaphragm arranged between the anode chamber and the cathode chamber;
a cathode side gas passage through which a cathode side gas discharged from the cathode chamber and containing the hydrogen gas flows;
a monitoring device configured to monitor at least one of a hydrogen concentration of the cathode side gas in the cathode side gas passage, an oxygen concentration of the cathode side gas in the cathode side gas passage, and an amount of electric power supplied to the water electrolysis tank;
a hydrogen supply passage through which the hydrogen gas is supplied to the cathode side gas in the cathode side gas passage to increase the hydrogen concentration of the cathode side gas; and
a flow regulating valve configured to regulate a flow rate of the hydrogen gas supplied through the hydrogen supply passage to the cathode side gas.

2. The water electrolysis system according to claim 1, further comprising a controller configured to control the flow regulating valve based on a monitoring result of the monitoring device, wherein:
the controller controls the flow regulating valve to stop supplying the hydrogen gas to the cathode side gas when the hydrogen concentration is higher than a reference hydrogen concentration, the oxygen concentration is lower than a reference oxygen concentration, or the amount of electric power supplied is larger than a reference electric power amount; and the controller controls the flow regulating valve to supply the hydrogen gas to the cathode side gas when the hydrogen concentration is the reference hydrogen concentration or less, the oxygen concentration is the reference oxygen concentration or more, or the amount of electric power supplied is the reference electric power amount or less.

3. The water electrolysis system according to claim 1, further comprising a compressor configured to compress the cathode side gas, wherein
the hydrogen supply passage is connected to a portion of the cathode side gas passage, the portion being located upstream of the compressor in a flow direction of the cathode side gas.

4. The water electrolysis system according to claim 1, further comprising a purifier configured to remove the oxygen gas from the cathode side gas to generate the hydrogen gas from the cathode side gas, wherein
the hydrogen gas generated by the purifier is supplied through the hydrogen supply passage to the cathode side gas.

5. The water electrolysis system according to claim 4, further comprising a storage tank configured to store the hydrogen gas generated by the purifier, wherein
the hydrogen gas stored in the storage tank is supplied through the hydrogen supply passage to the cathode side gas.

6. A method of operating a water electrolysis system, the water electrolysis system comprising:
a water electrolysis tank including
an anode chamber including an anode therein and configured to electrolyze water by electric power to generate an oxygen gas, the electric power being supplied from an outside,
a cathode chamber including a cathode therein and configured to electrolyze the water by the electric power to generate a hydrogen gas, and
a diaphragm arranged between the anode chamber and the cathode chamber;
a cathode side gas passage through which a cathode side gas discharged from the cathode chamber and containing the hydrogen gas flows;
a monitoring device configured to monitor at least one of a hydrogen concentration of the cathode side gas in the cathode side gas passage, an oxygen concentration of the cathode side gas in the cathode side gas passage, and an amount of electric power supplied to the water electrolysis tank;
a hydrogen supply passage through which the hydrogen gas is supplied to the cathode side gas in the cathode side gas passage to increase the hydrogen concentration of the cathode side gas; and
a flow regulating valve configured to regulate a flow rate of the hydrogen gas supplied through the hydrogen supply passage to the cathode side gas,
the method comprising
controlling the flow regulating valve to (i) stop supplying the hydrogen gas to the cathode side gas when the hydrogen concentration is higher than a reference hydrogen concentration, the oxygen concentration is lower than a reference oxygen concentration, or the amount of electric power supplied to the water electrolysis tank is larger than a reference electric power amount and (ii) supply the hydrogen gas to the cathode side gas when the hydrogen concentration is the reference hydrogen concentration or less, the oxygen concentration is the reference oxygen concentration or more, or the amount of electric power supplied is the reference electric power amount or less.

* * * * *